United States Patent Office

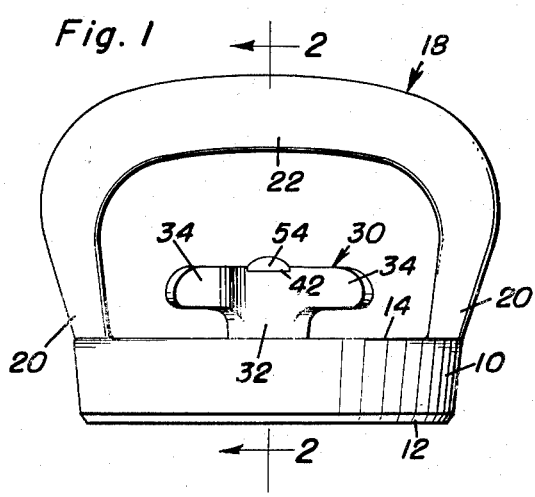
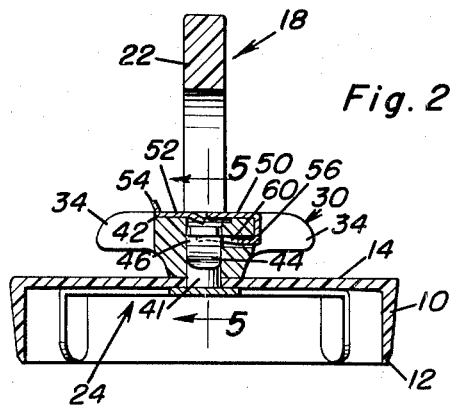
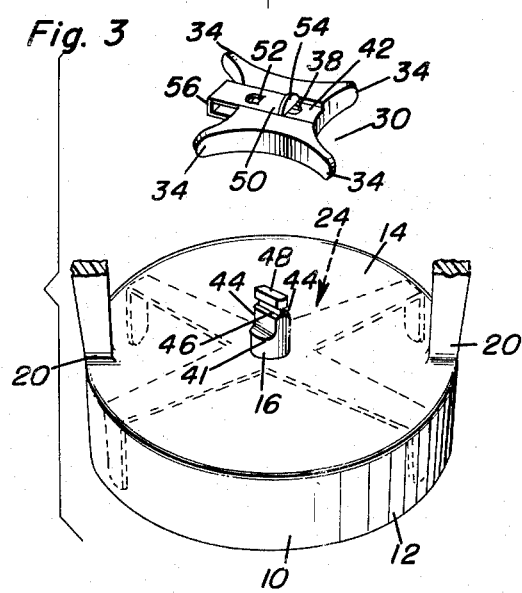
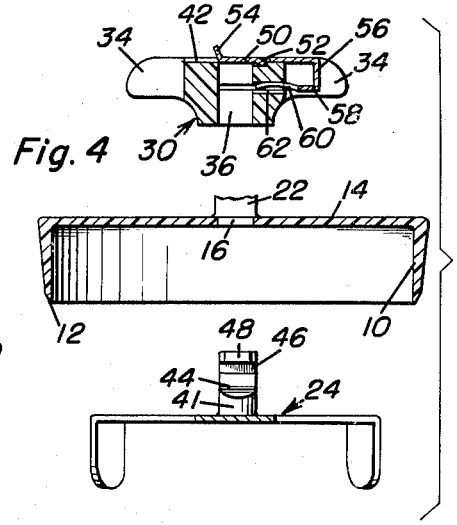
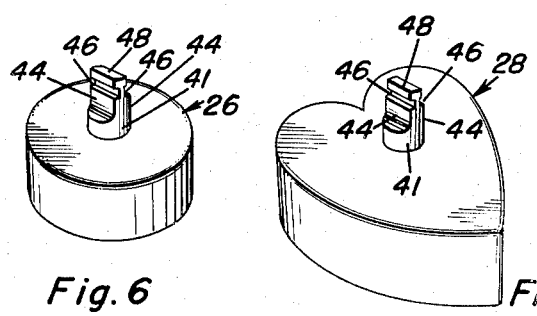
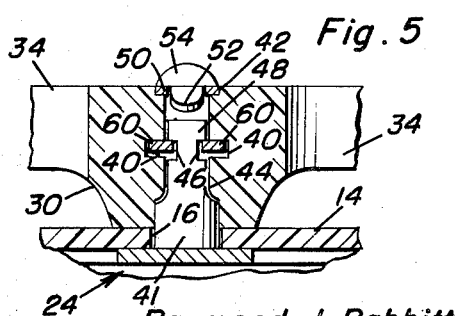

2,720,176
Patented Oct. 11, 1955

2,720,176

MOLD WITH INTERCHANGEABLE PRODUCT DISLODGING DEVICES

Raymond J. Babbitt, Cleveland, Ohio,

Application October 5, 1953, Serial No. 383,987

2 Claims. (Cl. 107—47)

The present invention relates, generally speaking, to molds which are used in shaping up various food products for cooking such as, for example, meat patty makers, doughnut makers, cookie makers and so on and has broad reference to a simple, portable implement which is characterized by a handle-equipped outer mold, a readily insertable, removable, and interchangeable product loosening, releasing, and displacing unit fitting operatively into the mold, a turning knob for the unit and ways and means for detachably associating the knob with the unit and a cooperating wall portion of said mold.

More specifically, the invention has to do with the combination of an improved turning knob, a complemental unit or an equivalent device which is rotated or turned through the instrumentality of the knob when the latter is attached thereto, and novel separable uniting means carried by the knob and unit, respectively, whereby a practical operating connection between the knob and unit is had, said connection being such that the knob and unit may be readily coupled and keyed together for turning in unison, or separated and thus conveniently dismantled for a number of purposes to be hereinafter revealed.

Although the invention is such that it lends itself to adaptable usefulness in various lines of endeavor, it is primarily in the nature of an improvement on a meat patty maker disclosed in Patent 2,631,331 granted to me on March 17, 1953, as well as an improvement on a similar construction which is subject matter of my copending application Serial No. 249,739, filed on October 4, 1951, now Patent No. 2,681,625, and which has to do with molds for making and releasing doughnuts, cookies and the like. To this end, it may be here stated that the subject matter of the two cases above identified are characterized, generically construed, by an outer circular cup mold having a central bearing hole in its flat top wall. An integral arch-shaped handle or hand-grip has its end portions connected to said mold at diametrically opposite points with its central portion overlying the bearing hole. Product contacting, dislodging and releasing means is confined and mounted for rotation in the outer cup mold and is provided with a central upstanding assembling and coupling pin fitting removably and rotatably in and extending upwardly through the bearing hole and above the plane of the top of the mold and terminating in a plane below the central gripping portion of the hand-grip. In this space a one-piece finger-actuated turning knob is situated and the knob is operatively connected with the pin by way of a set-screw for clampingly but rotatably maintaining the then cooperating parts in assembled read-to-use relationship. This separable connection is also employed to allow the parts to be dismantled for cleaning and other purposes.

As shown in the above mentioned cases, and also herein disclosed, the stated product dislodging "means" varies in form and purpose in that it may be a bladed cutter-scraper, an inner circular auxiliary cup-mold for cutting two distinct portions of dough simultaneously for making and dislodging doughnuts; or, alternatively, a non-circular ornamental cup mold for aptly making two color inlaid cookies. In any event, the set-screw which the knob carries and which affords the means for joining and assembling the knob and companion inner unit, outer food product mold, makes it difficult to hold said unit and knob together with one hand while tightening the set-screw with a tool held in the other hand. It follows, therefore, that the instant improvements appertain to a novel pin and a distinctly different knob wherein said knob is provided with a quickly manipulable latch which may be easily, by thumb and finger opened and closed and by means of which it is now only necessary to hold the inner unit and outer mold with one hand, to readily slip the knob on the protruding pin with other hand, and then snap the normally open latch to closed position, whereby to quickly and handily join and assemble all required parts for use, or to subseequently separate them for cleaning or to permit the cutter-scraper to be substituted for the inner cup mold (or vice versa) or to allow the non-circular cup mold to be brought into play, at the will of the user.

In carrying out a preferred embodiment of the concept the latch preferred is a simple substantially U-shaped spring clip whose resilient limbs straddle and slidingly embrace complemental recessed portions of the knob and wherein the upper limb has a detent to allow the latch to move but to retain it on the knob, said upper limb, in addition, having an upturned lip or nib at one end to expedite snapping the latch "on" and "off" as conditions require.

Another object of this invention is to incorporate in the latch, preferably the lower limb, spring fingers and to associate these with cooperating surfaces of the knob in a manner to produce an uplifting force, the latter also acting upon the assembling and coupling pin in such a way that the aforementioned inner unit is firmly, but yieldingly, maintained in suitably assembled freely rotatable wiping contact with the coacting bottom or underneath surface of the top wall of the outer cup mold.

In addition to the above, novelty is predicated on a plurality of interchangeable units all characerized by a standardized assembling and coupling pin which is insertable upwardly through the bearing hole in the top wall of the outer cup mold and whose upper protruding end is especially constructed in cross-section to lend itself adaptable to the knob, the knob being formed with a central passage into which the pin telescopes, and said knob having complemental recess means to accommodate the upper and lower springy limbs of the U-shaped clip or latch, making it possible to easily assemble and retain the latch on the knob, and to be able to push the latch in and out to either couple it to or uncouple it from the stated standardized pin.

Other objects, features and advantages will become more readily apparent from the following description and the accompanying sheet of illustrative drawings.

In the drawings:

Figure 1 is a side elevational view of a mold in which the improved attachable and detachable turnable knob is shown in elevation;

Figure 2 is a view taken at right angles to Figure 1 on the vertical line 2—2 of Figure 1 looking in the direction of the arrows and showing the parts in section and elevation, this being a form of mold in which the rotary bladed cutter is shown and functions for loosening and dislodging or displacing, for example, a meat patty;

Figure 3 is an exploded perspective view, with portions broken away and shown in section, the knob being separated from the pin;

Figure 4 is a similar exploded view with all of the essential parts shown independently and with the parts in section and elevation;

Figure 5 is an exaggerated fragmentary sectional and elevational view on the vertical line 5—5 of Figure 2 looking in the direction of the arrows;

Figure 6 is a perspective view of an inner cup mold used when the over-all device is utilized in molding a doughnut for frying; and Figure 7 is a perspective view showing one of the many varieties of the non-circular inner cup mold which is also capable of being used by itself and with the knob attached for cutting cookies.

The outer circular cup mold, which is constructed of commercial plastics or other suitable material, is denoted by the numeral 10, it being a cylindrical cup of shallow form having a cutting edge 12 at the bottom and having a flat circular top wall 14 with a central spindle or pin hole 16 forming what is also referred to as a bearing hole. The integral arch-shaped handle or hand-grip 18 has its end portions 20—20 connected to the mold at diametrically opposite points and has its central or bight portion 22 overlying the bearing hole 16.

The interchangeable product contacting, loosening, dislodging and releasing "means" are referred to as interchangeable cooperating auxiliary units, broadly speaking. For example, the bladed cutter unit is denoted at 24 and is used, obviously, for dislodging meat patties. The inner circular cup mold, for molding and dislodging doughnuts is a second type of unit and it is denoted by the numeral 26 (see Figure 6) and the non-circular inner cup mold unit, a third type, is denoted at 28 and is used for making and dislodging novel two-color inlaid cookies and appears in Figure 7. The one knob which serves in all instances for cooperation with the outer cup mold and also serves to assemble and releasably and elastically retain one of the various interchangeable units in the outer cup mold is denoted as a unit by the numeral 30. This may be of any shape or form but, similarly to the copending application and previously mentioned patent, it is preferably cruciform in top plan and includes a hub or body portion 32 and circumferentially spaced equidistant coplanar trip elements 34 projecting radially from the periphery of the hub or body portion of knob and being operable in a step-by-step manner to advance the knob one-quarter turn as each trip element 34 is actuated, said trip elements projecting to positions beyond the vertical side surfaces of the hand-grip 18 so that when one trip element is engaged and advanced one step, the next succeeding trip element is brought into an accessible position for the next operation of the knob and cutter or other unit, whereby the user may conveniently catch hold of the hand-grip and while holding the latter may reach down with a single finger or thumb and engage the tip thereof slidingly with a conveniently situated one of the trip elements and by imparting an approximate quarter turn to said knob, said inner cup mold for equivalent auxiliary unit becomes effective throughout a range of 360° cycle of an operation to dislodge the food product. These features are found in the aforementioned patent. In the instant situation the knob is unique because it has a central axial passage 36 therethrough from top to bottom cylindrical at its bottom and which upper portion restricted in cross-section and terminating in an oblong slot 38 (see Fig. 3). The intermediate diametrically opposite side portions are flattened to form a keyway and there is a pair of spaced parallel grooves as at 40—40 (see Fig. 5). The top surface of the knob is provided with a shallow groove which is here distinguished as an open-ended channel 42. Before continuing with the features of the knob, attention is now directed to the standardized shaft or pin which is found on all of the interchangeable inner units (24, 26 and 28). For example, as best shown in Figures 6 and 7, each unit has an axial integral pin whose portion adjacent to the top of the unit is cylindrical in cross-section as denoted at 41. Then on diametrically opposite sides are flat surfaces 44—44. In these flat surfaces are horizontal parallel open-ended grooves 46—46 which constitute keeper seats. The extreme upper end of the pin is reduced in cross-section to provide an oblong portion 48 which permits easy entry of the flat surfaces of the pin into the correspondingly shaped portion 38 of the passage in the knob. This especially designed pin constitutes an axle or spindle for the various units 24, 26 and 28 to render the latter interchangeable. As stated, the pins in all of these units are standardized and the one knob fits on all pins and makes it possible to selectively use the desired unit.

The aforementioned latch takes the form of a narrow spring metal U-shaped clip which is fitted and retained on the knob. This clip comprises a resilient upper or top arm 50 which is slidably and frictionally operable in the open ended channel 42. The intermediate portion of said arm 50 has a downward tongue or detent 52 engaging a shoulder provided in the knob and which serves to prevent accidental displacement of the spring clip from the knob. The free end of the arm 50 is bent up to provide a lip or nib 54 which provides a fingerpiece and facilitates opening and closing the latch. The bight portion of the latch is denoted at 56 and is disposed to move toward and from the peripheral portion of the knob. The lower limb 58 is also resilient and the free end thereof is bifurcated and the furcations provide fingers 60—60 which may be described as keeper fingers and these operate through a side slot or passageway 62 in the hub of the knob which slot registers with the main axial passageway 36. Thus, the fingers 60—60 are let into the passageway 36 by way of the side passageway or slot 62 and they may straddle the turning pin in the manner shown. That is to say, they may be projected into the grooves 40—40 and also the keeper seats 46—46 to elastically lock the pin and its companion unit in the outer mold cup. It is to be noted that the keeper fingers 60—60 are longitudinally bowed to frictionally engage the upper walls of the keeper seats 46—46 when the U-shaped clip is in "closed" position and to thus assemble and hold the auxiliary units (24, 26 or 28) and the knob 30 snugly but frictionally and rotatably against the cooperating wall 14 of the outer cup mold, the keeper fingers 60—60 also frictionally engaging the upper wall of the slot 62 and thus providing tension to hold the latch open when it is in "open" position.

This invention serves to provide a novel spring clip on the finger actuated knob of the meat patty maker, serving when attached to constitute means for resiliently clamping and rotatably maintaining the parts in assembled relationship and also serving as a means to provide the proper spring tension to effectually hold the bladed cutter or scraper against the upper wall of the receptacle portion of the meat patty mold when said spring clip is in a closed position and also to hold and keep itself "open" when in the open position.

The invention eliminates the set-screw in the finger actuated knob of the meat patty maker which is not herein shown but is shown and described in U. S. Patent No. 2,631,331 said set-screw being in a position that a screw driver is necessary to operate it.

As before stated when using a set-screw in the finger actuated knob it is difficult to mount the said knob and bladed cutter on the mold, and provide the desired spring tension to hold the bladed cutter yieldingly against the upper wall of the receptacle portion of the patty mold. It may be too tight or too loose when a set-screw is used. Also it is difficult to hold the bladed scraper, the mold and knob together with one hand and tighten the set-screw with a tool in the other hand. With the improved latch-equipped knob herein revealed it is only necessary to hold the bladed scraper and the mold with one hand, slip the knob on with the other hand and attach by pushing the spring clip in with one finger or the thumb of the last mentioned hand.

It will be seen that the invention therefore has to do with the over-all combination of a handle-equipped mold and interchangeable unit and the quick attachable and detachable latch-equipped knob, the knob by itself, and the units used individually or collectively with standardized especially designed assembling and coupling pins.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination, a turning knob for a complemental rotatable product loosening and releasing unit, said knob having a hub portion provided with an axial bore defining a passage therethrough from top to bottom, a top portion of said passage being non-cylindrical and oblong in plan, the intermediate portion being non-cylindrical, the top side of said knob being flat and having an open-ended channel with its intermediate portion registering with the top portion of said passage, said hub portion having a slot providing a second passage which is at right angles to the axial passage and which has its inner end opening into the axial passage and its opposite outer end opening through one side of said pin, and a latch comprising a U-shaped spring metal clip having top and bottom limbs and a connecting bight adjoining the same ends of said limbs to each other, said bottom limb sliding inwardly through said second named passage and into said first-named passage and being bifurcated, said top limb being slidably mounted in said channel, said top limb being provided with a detent and said detent being engageable with a cooperating portion of said knob in a manner to maintain the clip in its desired operative position on said knob, and a complemental rotatable producing loosening and releasing unit provided with an axially disposed upstanding assembling and coupling pin fitting removably into the passage and said hub portion and provided with a pair of diametrically opposite keeper grooves, said bifurcations constituting keeper fingers and the latter straddling said pin and being releasably fitted into said keeper grooves in a manner to releasably latch the knob in its useful position on said pin.

2. In a product forming and releasing mold construction, in combination, a cup mold having a top wall with flat top and bottom surfaces, said wall having a central bearing hole, a product contacting and releasing unit confined for rotary operation in said mold and provided with an axially disposed upstanding assembling and coupling pin, the latter fitted rotatably in said bearing hole and to a position above the plane of said top wall, a finger actuatable knob having an axially bored hub with flat faced portions corresponding to those on said pin, the latter fitting telescopically into said bore and being removably keyed therein, said hub having rotatable contact with said top surface, and a readily openable and closeable latch slidingly mounted on said knob and having portions releasably connected with said pin and also having a portion exposed and accessibly located in respect to said knob, whereby said latch may be slid to open and closed positions by finger actuation and so that said pin may be slid readily through said bearing hole, said knob then slipped down over the protruding portion of the pin and said latch, which is normally open when the knob is off, may be closed and the knob thus latched in its operable position, said pin being provided with diametrically opposite keeper grooves, the hub portion of said knob having a slot at right angles to said bore, the inner end of the slot opening into said bore and the outer end thereof opening through one side of said hub, and also having an open ended channel, and said latch comprising a U-shaped spring metal clip having top and bottom limbs and a connecting bight at corresponding ends of the limbs, the bottom limb sliding inwardly through said slot and the projecting end being bifurcated, the top limb being slidable back and forth in said open ended channel, said bifurcations providing keeper fingers and the latter being releasably projectable into their respective keeper seats with said fingers straddling the pin, said fingers being longitudinally bowed and thus embodying resilient properties and cooperating with coacting upper surface portions of said keeper seats in a manner which places said fingers under tension with the result that said unit is maintained in yieldable contact with said top wall when the latch is closed, said fingers also fitting into said slot and having yieldable contact with the walls thereof in a manner to frictionally but yieldingly engage coacting surface portions of said slot and to thus expedite holding said clip in an open position to facilitate the steps of applying the knob and removing the knob from said pin.

References Cited in the file of this patent
UNITED STATES PATENTS

| | | |
|---|---|---|
| 363,743 | Herrick | May 24, 1887 |
| 520,917 | Eggeling | June 5, 1894 |
| 1,259,397 | Hathaway | Mar. 12, 1918 |
| 1,269,413 | Finnigan | June 11, 1918 |
| 1,658,264 | Sutton | Feb. 7, 1928 |
| 1,961,383 | Nye | June 5, 1934 |
| 2,172,977 | Kimball | Sept. 12, 1939 |
| 2,631,331 | Babbitt | Mar. 17, 1953 |
| 2,643,903 | Nathan | June 30, 1953 |